United States Patent
Prokesch

(10) Patent No.: US 9,573,847 B2
(45) Date of Patent: Feb. 21, 2017

(54) SYSTEM FOR THE PRODUCTION OF FINE LIME

(71) Applicant: FLSMIDTH A/S, Valby (DK)

(72) Inventor: Michael Edward Prokesch, Coopersburg, PA (US)

(73) Assignee: FLSMIDTH A/S (DK)

( * ) Notice: Subject to any disclaimer, the term of this patent is extended or adjusted under 35 U.S.C. 154(b) by 37 days.

(21) Appl. No.: 14/442,446

(22) PCT Filed: Nov. 27, 2013

(86) PCT No.: PCT/US2013/072162
§ 371 (c)(1),
(2) Date: May 13, 2015

(87) PCT Pub. No.: WO2014/085538
PCT Pub. Date: Jun. 5, 2014

(65) Prior Publication Data
US 2016/0272539 A1    Sep. 22, 2016

Related U.S. Application Data

(60) Provisional application No. 61/731,870, filed on Nov. 30, 2012.

(51) Int. Cl.
| | | |
|---|---|---|
| C04B 2/10 | (2006.01) | |
| C04B 2/12 | (2006.01) | |
| C04B 2/02 | (2006.01) | |

(52) U.S. Cl.
CPC . C04B 2/10 (2013.01); C04B 2/02 (2013.01); C04B 2/12 (2013.01)

(58) Field of Classification Search
CPC ................. C04B 2/10; C04B 2/02; C04B 2/12
See application file for complete search history.

(56) References Cited

U.S. PATENT DOCUMENTS 3,878,288 A * 4/1975 Commins ................ C04B 2/10
                                                             423/175
4,616,575 A * 10/1986 Schulte .................... C04B 2/10
                                                             110/216

(Continued)

FOREIGN PATENT DOCUMENTS

| RU | 2413913 C2 | 3/2011 |
| WO | 9732174 A1 | 9/1997 |

OTHER PUBLICATIONS

Volzhensky A. V. et al, Mineralnyve vyazhuschie veschestva. Moskva Stroiizdat, 1973, p. 101-102.

(Continued)

*Primary Examiner* — Anthony J Zimmer
(74) *Attorney, Agent, or Firm* — Matthew R. Weaver; Daniel DeJoseph; Aaron M. Pile

(57) ABSTRACT

The present invention is directed to a method of continuously calcining a limestone particle mix comprising a fine fraction of limestone particles and a coarser fraction of limestone particles. The limestone particles heat treated in a flash calciner in which the mixture is entrained and heated in process gas for an amount of time sufficient to fully calcine the fine fraction but not the coarser fraction. The process gas is separated from the heated limestone mixture. The mixture is directed to a retention vessel in which the mixture is retained for an amount of time sufficient to fully calcine the coarser fraction utilizing the process heat present in the limestone mixture. No external heat needs to be added to the retention vessel during the retention step to promote calcination.

5 Claims, 1 Drawing Sheet

(56) References Cited

U.S. PATENT DOCUMENTS

| | | | | |
|---|---|---|---|---|
| 4,948,364 A | * | 8/1990 | Thompson | C21C 5/36 |
| | | | | 432/101 |
| 5,230,880 A | * | 7/1993 | Baudequin | C04B 2/106 |
| | | | | 423/165 |
| 5,260,041 A | | 11/1993 | Cohen et al. | |
| 5,919,038 A | * | 7/1999 | Labelle | C04B 2/106 |
| | | | | 432/106 |
| 2004/0099658 A1 | * | 5/2004 | Patzelt | C04B 2/10 |
| | | | | 219/546 |
| 2007/0104630 A1 | * | 5/2007 | Huege | C04B 2/02 |
| | | | | 423/155 |
| 2008/0253956 A1 | * | 10/2008 | Rossi | C04B 2/06 |
| | | | | 423/438 |

OTHER PUBLICATIONS

The International Search Report and Written Opinion dated Apr. 10, 2014, 6 pages.

\* cited by examiner

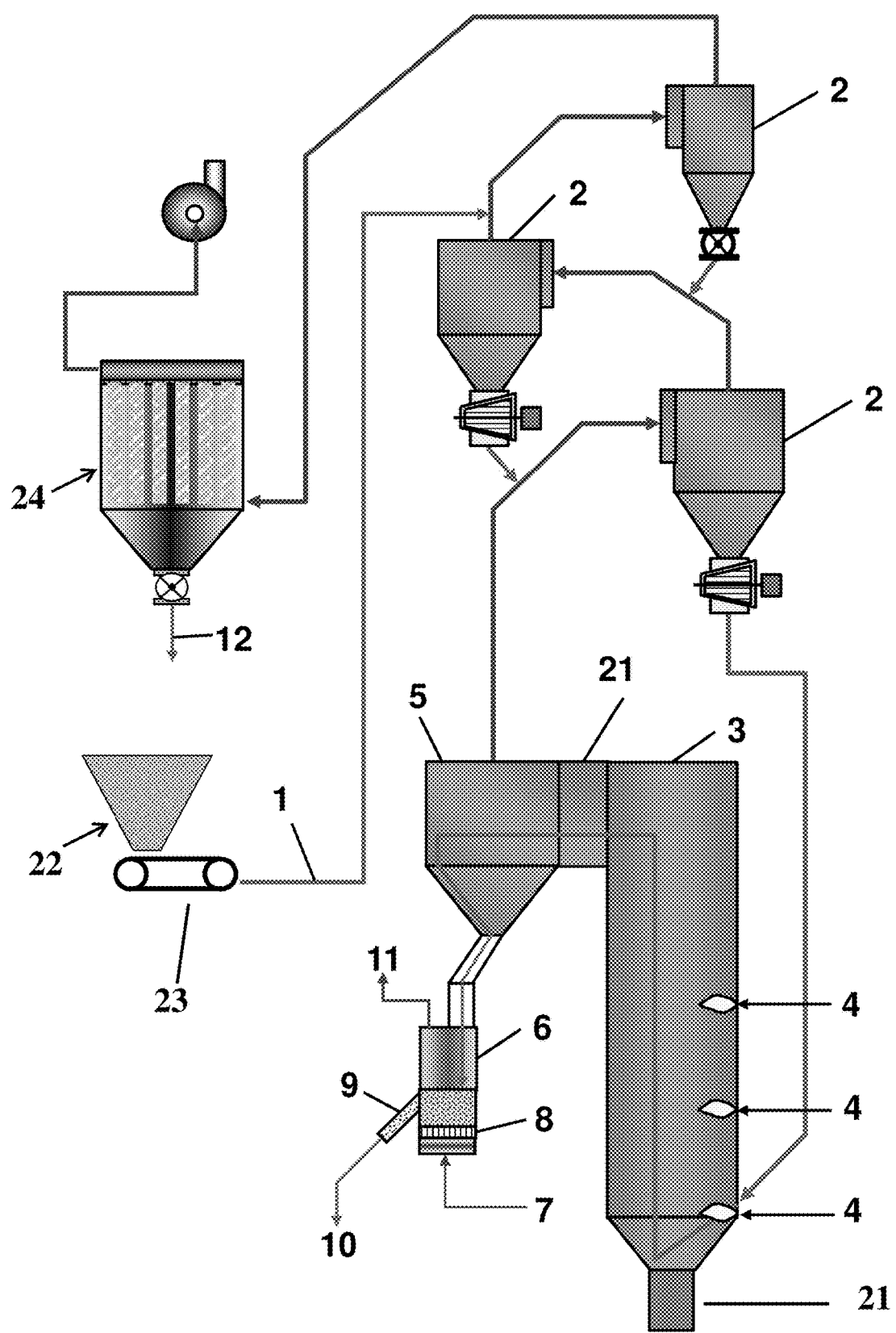

SYSTEM FOR THE PRODUCTION OF FINE LIME

FIELD OF INVENTION

The present invention relates to an improvement to the gas suspension flash calcination process for the conversion of relatively coarse limestone fines into a calcined lime with a low residual carbonate content.

BACKGROUND OF THE INVENTION

A standard method to calcine limestone fines into lime is via a continuous gas suspension flash calciner process. In such a process, limestone fines are entrained in a heated process gas which passes upward through a vertically situated flash calciner. The flash calciner is sized and the process gas velocity is selected so that the residence time of the limestone particles within the calciner will typically be limited to from about 1 to 3 seconds. During this time full decomposition of limestone to lime must occur. Due to excellent gas/solids contact this decomposition can be achieved for particles ranging up to a nominal diameter of 0.5-1 mm using acceptable operating temperatures up to 1100-1200° C. Such particles will make up the majority of the particle size distribution of the limestone fines subject to flash calcination. However, larger particles (such as up to a top size of about 4 mm) which constitute a minority fraction of the particles in the flash calciner, require the utilization of much higher gas temperatures than 1200° C. to complete their decomposition within the time constraints set forth above. Therefore, in such a prior art process there is significant non-uniform calcinations across a wide particle size range. In order to simultaneously calcine the larger fraction in a flash calcination system it has been necessary to utilize significantly higher temperatures in the system with correspondingly increasing energy costs while contributing to adverse affects such promoting coating formation, reducing lime reactivity and possibly over-burning the finer particles in the particle mix.

A method to promote the uniform calcination of both the finer and coarser fraction of the limestone fines treated in a flash calcination process without the above adverse effects is needed. In order to be commercially viable, such a method should not add significantly to the complexity, capital cost or operating costs of the system nor add significantly to overall energy consumption.

SUMMARY OF THE INVENTION

The present invention allows for the calcination of a limestone fraction across an extremely wide particle size range containing both finer (from about 10 microns or less to about 1 mm in nominal diameter) and coarser particles (about 1-4 mm in nominal diameter). According to the present invention, the particle retention time at normal calcination temperatures (i.e. within the range of about 1100-1200° C.) is increased without, for example, extending the length of the flash calciner or investing in higher energy costs and therefore greatly adding to the capital costs of the system. Furthermore, by utilizing the method of the present invention the coarser particle fraction is calcined without overburning the finer particles.

The present invention utilizes a flash calcination system to continuously calcine limestone materials having particles with a top size of typically about 4 mm, although it is effective with particles with a top size of about 10 mm. After exiting the flash calciner, process gas is separated from the limestone particles and the particles are directed to a retention tank for further calcination of the upper sized limestone particles. It is notable that only the system heat inherent in the separated limestone particles is required for further calcination of the larger fraction of the limestone particles. It has been discovered that no external heat needs to be added to the retention tank to promote the further calcination of the coarser fraction of the particles, i.e. particles having a size range of from above about 1 mm to about 10 mm, and most typically of from above about 1 mm to about 4 mm, with only the process heat of the particles being sufficient to promote complete calcination. In effect, there is particle to particle heat transfer within the retention vessel in which the sensible heat retained in the fully calcined smaller particles is imparted to the larger particles with the resulting calcination of the unreacted core of the larger particles.

Other details, objects, and advantages of the invention will become apparent as the following description of certain present preferred embodiments thereof and certain present preferred methods of practicing the same proceeds.

BRIEF DESCRIPTION OF THE DRAWING

The present preferred embodiments of the invention are shown in the accompanying drawing in which: the FIGURE is a view of a system of the present invention in which a flash calciner is used in conjunction with a retention tank in accordance with an exemplary embodiment. The movement of gas in the system is denoted by the green (or solid) lines and the movement of gases in the system is denoted by the blue (or dotted) lines in the FIGURE.

DETAILED DESCRIPTION OF PRESENT PREFERRED EMBODIMENTS

Reference will now be made in detail to the present preferred embodiments of the invention, examples of which are illustrated in the accompanying drawing.

A limestone particle mix advantageously treated by the present method will have a first portion (from about 50 to about 90 percent (by wt) of a finer fraction, i.e. particles having a nominal diameter of no more than about 1 mm) and a second portion (from about 10 to about 50 percent (by wt) of a coarser fraction, i.e. particles having a nominal diameter of greater than about 1 mm to no more than about 4 mm. It is for these size ranges that the process of the present invention is particularly effective. However, it is possible that the particle mix can also contain a negligible amount (less than about 10 percent (by wt) of particles having a nominal diameter of greater than about 4 mm to about 10 mm.

The FIGURE is a perspective view of a flash calciner 3 used in an exemplary embodiment of the present invention. The configuration of the flash calciner 3 is of a conventional design, i.e. it is vertically situated with the fines to be treated entering in a lower area 20, traveling upward through the calciner entrained in heated process gas, and exiting the calciner at an upper area 21 of the calciner. The retention time within the calciner will be determined by the gas velocity through the calciner and the internal dimensions of the calciner. Typically it will be very short—generally in the range of from 1 to 3 seconds.

The material is charged (and/or placed) into an upper end of one or more preheating vessels 2 from a hopper 22 or other source of material via a feed pipe or other material feeding device. As depicted, limestone fines stored in feed hopper 22 are metered onto conveying means 23 from which they pass to feed conduit 1 and then into one or more cyclone preheaters 2, in which they are preheated by system off gases from gas-solid separator 5. The gases travel in a counter-current heat exchange fashion to the downward passage of fines through the preheater system. After exiting the preheater system the off gases are directed to dust collector 24 to remove any limestone dust still present in the process gas.

Flash calciner 3 is utilized to achieve, in most cases, approximately 90-100% calcium carbonate decomposition within the calciner vessel using a typical operating temperature range of 1100-1200° C., which is achieved via the injection of fuel at one or more fuel ports 4. The material is passed from flash calciner 3 to gas-solid separation cyclone 5. The separated material is discharged by gravity from flash calciner separation cyclone 5 into stationary retention vessel 6. Alternatively, the separation cyclone can have an integrated retention zone in a bottom portion thereof.

The particles exit the gas separation process step having a temperature close to the calciner temperature within the flash calciner (i.e. they will typically be about 5 to about 10° C. less than their temperature in the calciner). As a result, when the particles are retained within the retention vessel calcination continues on the partially calcined coarser fraction of materials, which take energy from the calcined finer particles, while maintaining a temperature below the temperature at which overburning of the finer fraction of particles would occur.

The retention vessel is designed to maximize the retention of the process heat contained by the particles. Therefore, the vessel is advantageously refractory lined to reduce the rate of loss of the process heat from the lime particles and hence the retention vessel. The vessel is sized to have an average particle residence time sufficient to thereby essentially completely calcine the coarser fraction of material. The actual average retention time will depend on variables such as the amount of coarser fraction in the particle mix, the temperature range within the flash calciner, the retention time within and rate of material throughput from the calciner and the particle size distribution of the coarser fraction. Typically, an average retention time within the retention vessel of from about 3 to about 10 minutes will be suitable to essentially completely calcine the coarser fraction of material and to thereby have a product with a low residual carbonate content. The volume of the retention vessel will be designed based on the throughput of the system since the amount of material entering the vessel will displace an equal volume from the vessel. For example, if material enters the vessel at a given rate per minute, and a retention time of 4 minutes is determined to be satisfactory to achieve a product with the required degree of calcination, then the vessel should be sized to hold at least hold at least the volume of material that would be discharged from gas-solid separation cyclone 5 over a four minute period. For all practical purposes, however, the vessel should be somewhat oversized to increase the average retention time to account for the fact that the individual particles will have a random component of movement, and therefore the individual particles will have varying retention times to thereby insure that there is essentially complete calcination across the coarser particle range.

A small quantity of air 7, which can be ambient, can be advantageously added to the retention vessel through distribution plate 8, which contains a number of orifice openings or holes, to promote a mild state of particle aeration to thereby promote homogenous mixing of the particles and heat transfer within the retention vessel. The amount and velocity of the air added will only be sufficient to promote the minimum velocity fluid state within the retention vessel and will not be sufficient to entrain the material or significantly reduce the process heat within the retention vessel. The sensible heat of the solids entering the retention vessel will provide the necessary energy required to complete the calcination process, and an additional external source of heat is not needed to have complete calcination of the particles with the retention vessel.

The fully calcined lime fines are discharged from the retention vessel via an overflow duct 9. Alternatively, an underflow withdrawal arrangement can be employed. The discharged fines are normally introduced into a heat recovery circuit (not shown) via conduit 10. The hot air, CO2, generated by calcination and fines 11 leaving the retention vessel may be vented back into the flash calciner circuit for operational simplicity, or processed through a separate cooling and particulate collection circuit to ensure collection of fine particles of lime entrained in the retention vessel exit gases. Dust 12 realized from dust collector 24 may be introduced to the retention vessel to be calcined/converted to lime to thereby increase the overall lime product yield from the limestone fines feed without impacting the operating stability of the flash calciner circuit, which can be sensitive to excessive dust in the circuit.

The present process enables the complete calcination of coarse limestone samples up to 10 mm in size using a stationary retention vessel that supports calcination at temperatures that allow for optimization of the lime product properties while utilizing the sensible heat in the flash calcined solids to complete the calcination process and improve the overall system specific fuel consumption. This vessel also supports the recovery of partially calcined dust from the main system dust collector for conversion to lime.

The feed material is preferably limestone or other mineral aggregate such as chalk and/or marble containing in excess of 90% calcium carbonate and that has ideally been processed to be clear and free of matter such as clay and/or dust.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. A method of continuously calcining a limestone particle mix comprising a fine fraction of limestone particles and a coarser fraction of limestone particles, said method comprising (a) heat treating the limestone particles in a flash calciner in which the particles are entrained and heated in process gas for an amount of time sufficient to fully calcine the fine fraction but not the coarser fraction; (b) separating the heated limestone particles from the process gas; (c) maintaining the separated heated limestone particles in a retention vessel for an amount of time sufficient to fully calcine the coarser fraction by transferring the heat contained in the fine fraction of particles to the coarser fraction of particles.

2. The method of claim 1 wherein the particles in the fine fraction have a diameter up to about 1 mm and the particles in the coarser fraction have a diameter of from greater than 1 mm to about 10 mm.

3. The method of claim 2 wherein the particles in the coarser fraction have a diameter of from greater than 1 mm to about 4 mm.

4. The method of claim 1 wherein the heated limestone mixture is maintained at its minimum fluidization velocity within the retention vessel.

5. The method of claim 1 wherein the separated process gas from step (b) is directed to a dust collector to remove any limestone dust present in the process gas, and the separated limestone dust is forwarded to the retention vessel to be calcined to lime.

* * * * *